(12) United States Patent
Mino et al.

(10) Patent No.: US 10,658,850 B2
(45) Date of Patent: May 19, 2020

(54) BATTERY MODULE AND BATTERY SYSTEM HAVING THE SAME

(71) Applicant: TDK Corporation, Tokyo (JP)

(72) Inventors: Takayuki Mino, Tokyo (JP); Masayuki Yamashima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 101 days.

(21) Appl. No.: 15/875,150

(22) Filed: Jan. 19, 2018

(65) Prior Publication Data

US 2018/0212444 A1 Jul. 26, 2018

(30) Foreign Application Priority Data

Jan. 20, 2017 (JP) ................................. 2017-008253

(51) Int. Cl.
*H02J 7/00* (2006.01)
*H01M 10/48* (2006.01)
*H01M 10/42* (2006.01)
*H01M 10/0525* (2010.01)
*H01M 2/10* (2006.01)

(52) U.S. Cl.
CPC ......... *H02J 7/0019* (2013.01); *H01M 2/1077* (2013.01); *H01M 10/0525* (2013.01); *H01M 10/425* (2013.01); *H01M 10/482* (2013.01); *H02J 7/00* (2013.01); *H02J 7/0021* (2013.01); *H01M 2010/4271* (2013.01); *H02J 2207/10* (2020.01)

(58) Field of Classification Search
CPC ........ H02J 7/0019; H02J 7/00; H01M 2/1077; H01M 10/425; H01M 10/4882
USPC ......................................................... 320/118
See application file for complete search history.

(56) References Cited

U.S. PATENT DOCUMENTS

| 8,339,100 B2* | 12/2012 | Li | H01M 10/42 320/118 |
| 10,522,882 B2* | 12/2019 | Nagato | G01R 31/3647 |
| 2011/0012560 A1* | 1/2011 | Sakakibara | H01M 10/441 320/118 |
| 2011/0140673 A1* | 6/2011 | Zhang | H02J 7/0029 320/145 |
| 2016/0233700 A1 | 8/2016 | Muto | |
| 2019/0036177 A1* | 1/2019 | Nagato | H01M 10/482 |

FOREIGN PATENT DOCUMENTS

JP 2016-146728 A 8/2016

* cited by examiner

*Primary Examiner* — Richard V Muralidar
(74) *Attorney, Agent, or Firm* — Young Law Firm, P.C.

(57) ABSTRACT

Disclosed herein is a battery module that includes an external power supply terminal, a battery cell, a monitoring circuit that monitors a state of the battery cell, and a switch circuit that supplies one of an electric power supplied from the external power supply terminal and an electric power supplied from the battery cell to the monitoring circuit based on a switching signal.

11 Claims, 4 Drawing Sheets

BATTERY MODULE AND BATTERY SYSTEM HAVING THE SAME

BACKGROUND OF THE INVENTION

Field of the Invention

The present invention relates to a battery module and a battery system having the same and, more particularly, to a battery module capable of leveling a battery residual capacity and a battery system having the same.

Description of Related Art

In recent years, a battery such as a lithium-ion battery is widely used as a power supply for electric cars or hybrid cars. A battery for electric cars or hybrid cars is required to provide a large current and a high voltage, so that, generally, a plurality of battery modules are connected in parallel or series in such cars (see JP 2016-146728A).

However, when a plurality of battery modules are used by connecting them in parallel or series, a variation may occur in battery residual capacity between the battery modules. Such a variation in the battery residual capacity may bring about a problem such as overcharge or acceleration of degradation of some battery modules, so that the battery residual capacity needs to be leveled as much as possible.

As a method for leveling the battery residual capacity, a method of performing internal discharge in a battery module having a large residual capacity can be considered. However, this method may involve not only occurrence of an unnecessary capacity loss or heat generation but also the necessity of addition of an internal discharge mechanism, leading to an increase in size of the battery module.

SUMMARY

It is therefore an object of the present invention to provide a battery module capable of leveling the battery residual capacity without involving an unnecessary capacity loss and a battery system having the same.

A battery module according to the present invention includes an external power supply terminal, a battery cell, a monitoring circuit that monitors a state of the battery cell, and a switch circuit that supplies one of an electric power supplied from the external power supply terminal and an electric power supplied from the battery cell to the monitoring circuit based on a switching signal.

According to the present invention, the electric power can be selectively (exclusively) supplied from one of the external power supply and the battery cell to the monitoring circuit, making it possible to operate the monitoring circuit by using the external power supply when the battery residual capacity is small and to operate the monitoring circuit by using power supplied from the incorporated battery cell when the battery residual capacity is large. Thus, even in a configuration where a plurality of battery modules are used, it is possible to level the battery residual capacity without involving unnecessary capacity loss.

In the present invention, the switching signal may be generated by the monitoring circuit. In this case, the battery module according to the present invention may further include a control terminal, and the monitoring circuit may generate the switching signal in response to a control signal externally supplied through the control terminal. With this configuration, the operation power supply for the monitoring circuit can be switched from the external power supply.

A battery system according to the present invention includes a plurality of the battery modules and a controller that supplies the control signal to the control terminals of the plurality of battery modules. According to the present invention, it is possible to switch the operation power supply for the monitoring circuit by the controller.

In the present invention, it is preferable that the monitoring circuit supplies a state signal indicating the state of the battery cell to the controller through the control terminal and that the controller generates the control signal based on the state signal supplied from each of the plurality of battery modules. In this case, the controller preferably generates the control signal so as to level the battery residual capacity among the plurality of battery modules. Thus, it is possible to level the battery residual capacity without involving an unnecessary capacity loss.

As described above, according to the present invention, it is possible to level the battery residual capacity without involving an unnecessary capacity loss.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

Figure 1:
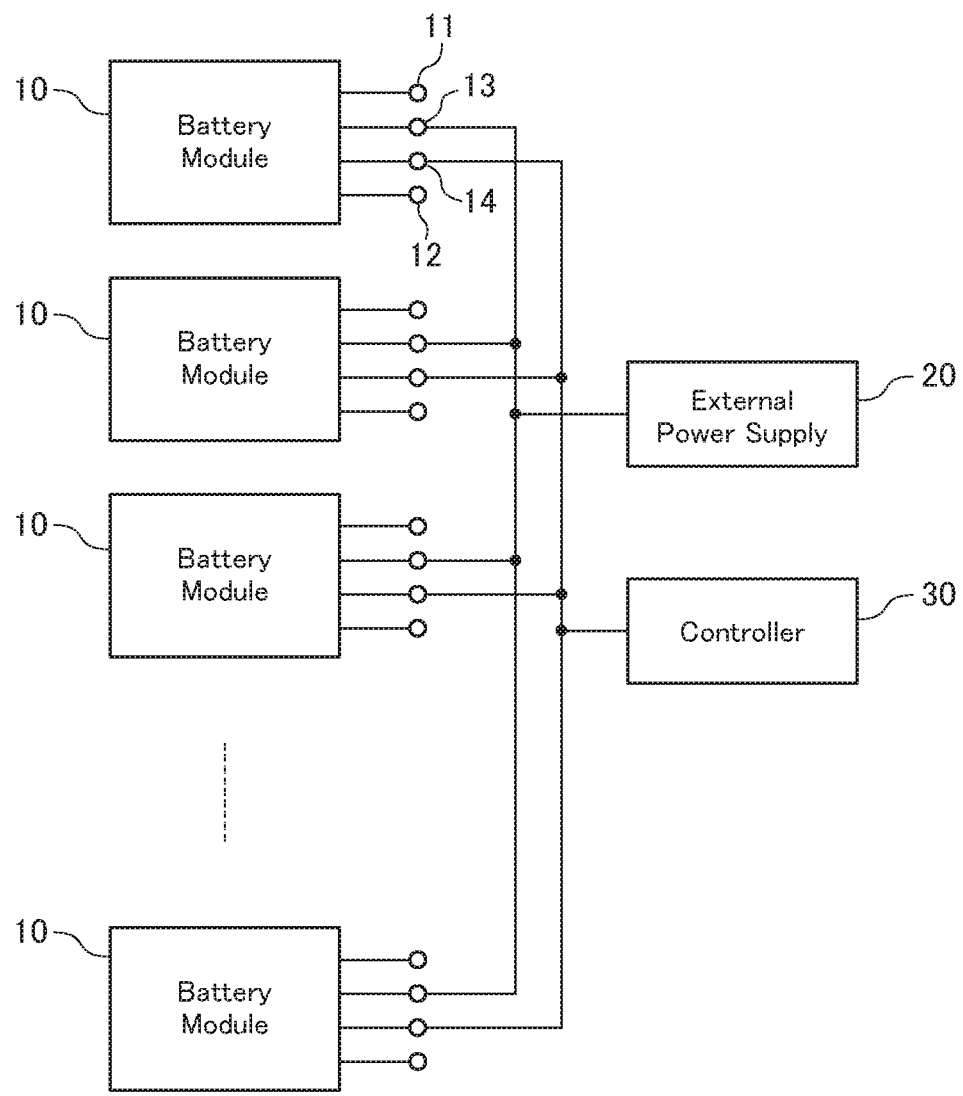
FIG. 1 is a block diagram illustrating the configuration of a battery system according to a preferred embodiment of the present invention.

FIG. 1 is a block diagram illustrating the configuration of a battery system according to a preferred embodiment of the present invention.

As illustrated in FIG. 1, the battery system according to the present embodiment includes a plurality of battery modules 10, an external power supply 20, and a controller 30. The battery modules 10 each include a positive electrode terminal 11, a negative electrode terminal 12, an external power supply terminal 13, and a control terminal 14. The external power supply terminal 13 is connected to the external power supply 20, and the control terminal 14 is connected to the controller 30. The positive electrode terminal 11 and the negative electrode terminal 12 are each connected to a load (not illustrated) or a charger (not illustrated).

Figures 2A, 2B:
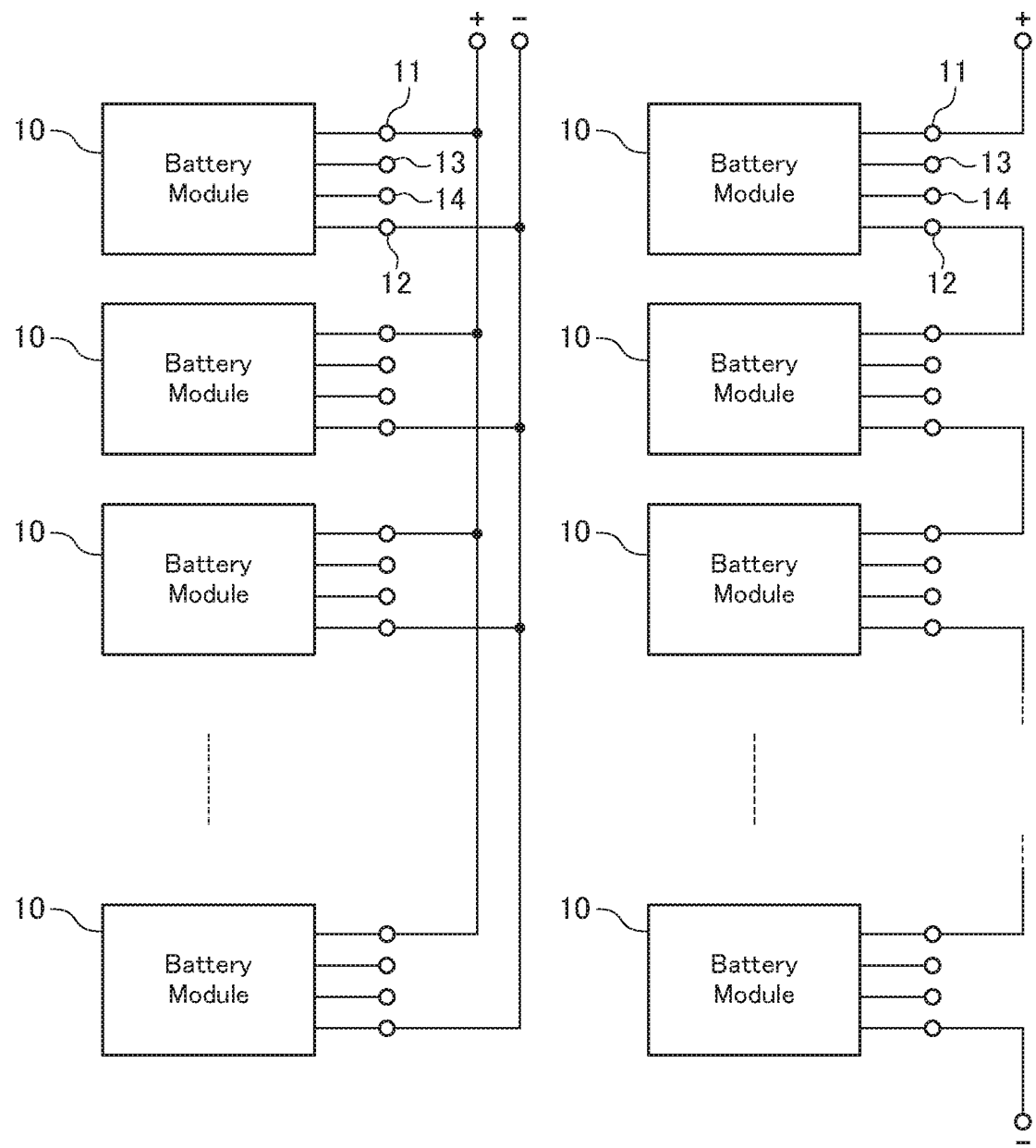
FIG. 2A shows an example that a plurality of battery modules are connected in parallel.
FIG. 2B shows an example that a plurality of battery modules are connected in serial.

A connection mode between the plurality of battery modules 10 and the load or charger is not especially limited, and parallel connection as illustrated in FIG. 2A and series connection as illustrated in FIG. 2B are available. Alternatively, when the plurality of battery modules 10 are divided into a plurality of groups, the battery modules in each group may be connected in parallel, and the plurality of battery module groups are connected in series.

Figure 3:
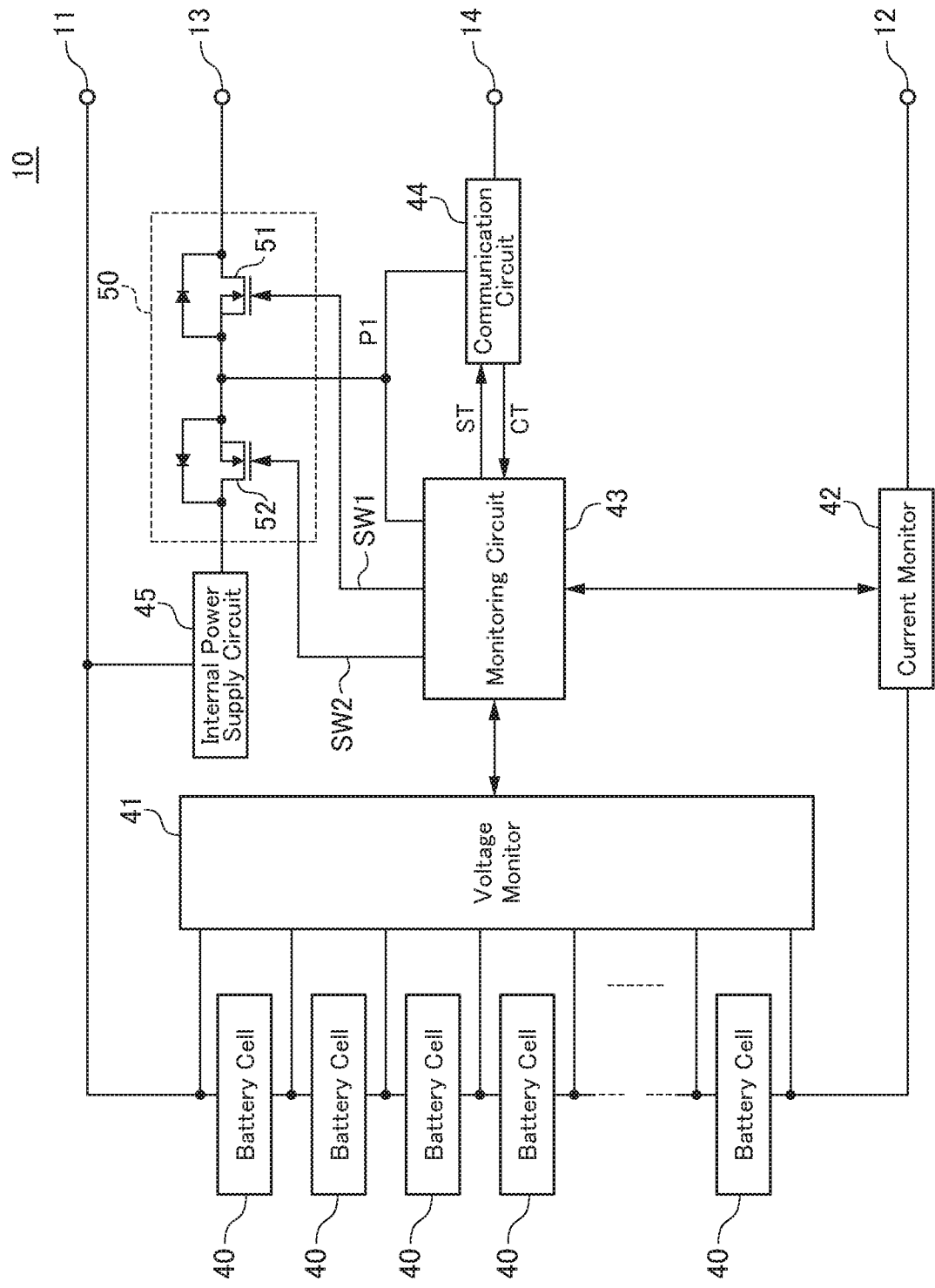
FIG. 3 is a bock diagram illustrating the configuration of each battery module 10.

FIG. 3 is a bock diagram illustrating the configuration of each battery module 10.

As illustrated in FIG. 3, the battery module 10 includes a plurality of series-connected battery cells 40. The battery cells 40 are each, e.g., a laminate-cell type lithium-ion battery. One end of the plurality of series-connected battery cells 40 is connected to the positive electrode terminal 11, and the other end thereof is to the negative electrode terminal 12. Thus, by connecting a load to the positive electrode terminal 11 and the negative electrode terminal 12, an electric charge charged in the battery cells 40 can be supplied to the load. Alternatively, by connecting a charger to the positive electrode terminal 11 and the negative electrode terminal 12, the battery cells 40 can be charged.

The voltage of each battery cell 40 is measured by a voltage monitor 41, and current flowing in battery cells 40 is measured by a current monitor 42. The voltage monitor 41 and the current monitor 42 are connected to a monitoring circuit 43. The monitoring circuit 43 monitors states of cell voltages of each battery cell 40 and a charge/discharge current based on measurement results from the voltage monitor 41 and current monitor 42. The monitoring circuit 43 further has a function of determining a state of each battery cell 40 based on the measurement/monitoring results to generate a state signal ST indicating a result of the determination. The state signal ST is fed back to the controller 30 through a communication circuit 44 and a control terminal 14. On the other hand, a control signal CT is supplied from the controller 30 to the monitoring circuit 43 through the control terminal 14 and the communication circuit 44.

An electric power P1 is supplied to the monitoring circuit 43 and communication circuit 44 through a switch circuit 50. The switch circuit 50 includes switch elements 51 and 52 and is controlled by switching signals SW1 and SW2 supplied from the monitoring circuit 43. Although not especially limited, both the switch elements 51 and 52 may be an N-channel MOS transistor.

The switch element 51 is connected between the external power supply terminal 13 and the monitoring and communication circuits 43 and 44 and is maintained in an ON state in the initial state after a reset by activation of the switching signal SW1. On the other hand, the switch element 52 is connected between an internal power supply circuit 45 and the monitoring and communication circuits 43 and 44 and is maintained in an OFF state in the initial state after a reset by deactivation of the switching signal SW2. The internal power supply circuit 45 is a linear regulator or a DC-DC converter connected to the positive electrode terminal 11 and is configured to receive power supplied from the battery cells 40 and supply the electric power P1 to the monitoring circuit 43 and the communication circuit 44 based on the received electric power.

The switching signals SW1 and SW2 are exclusively activated under the control of the monitoring circuit 43, whereby one of the switch elements 51 and 52 is turn ON, and the other one thereof is turned OFF. Turning ON of the switch element 51 causes the electric power P1 to be supplied to the monitoring circuit 43 and the communication circuit 44 through the external power supply terminal 13, so that the battery residual capacities of the battery cells 40 are not reduced by the operation of the monitoring circuit 43 and the communication circuit 44. On the other hand, turning ON of the switch element 52 causes the electric power P1 to be supplied to the monitoring circuit 43 and the communication circuit 44 from the battery cells 40, so that the battery residual capacities of the battery cells 40 are reduced by the operation of the monitoring circuit 43 and communication circuit 44. Such a switching operation of the switch circuit 50, i.e., generation of the switching signals SW1 and SW2 is controlled by the monitoring circuit 43 based on the control signal CT supplied from the controller 30.

Figure 4:
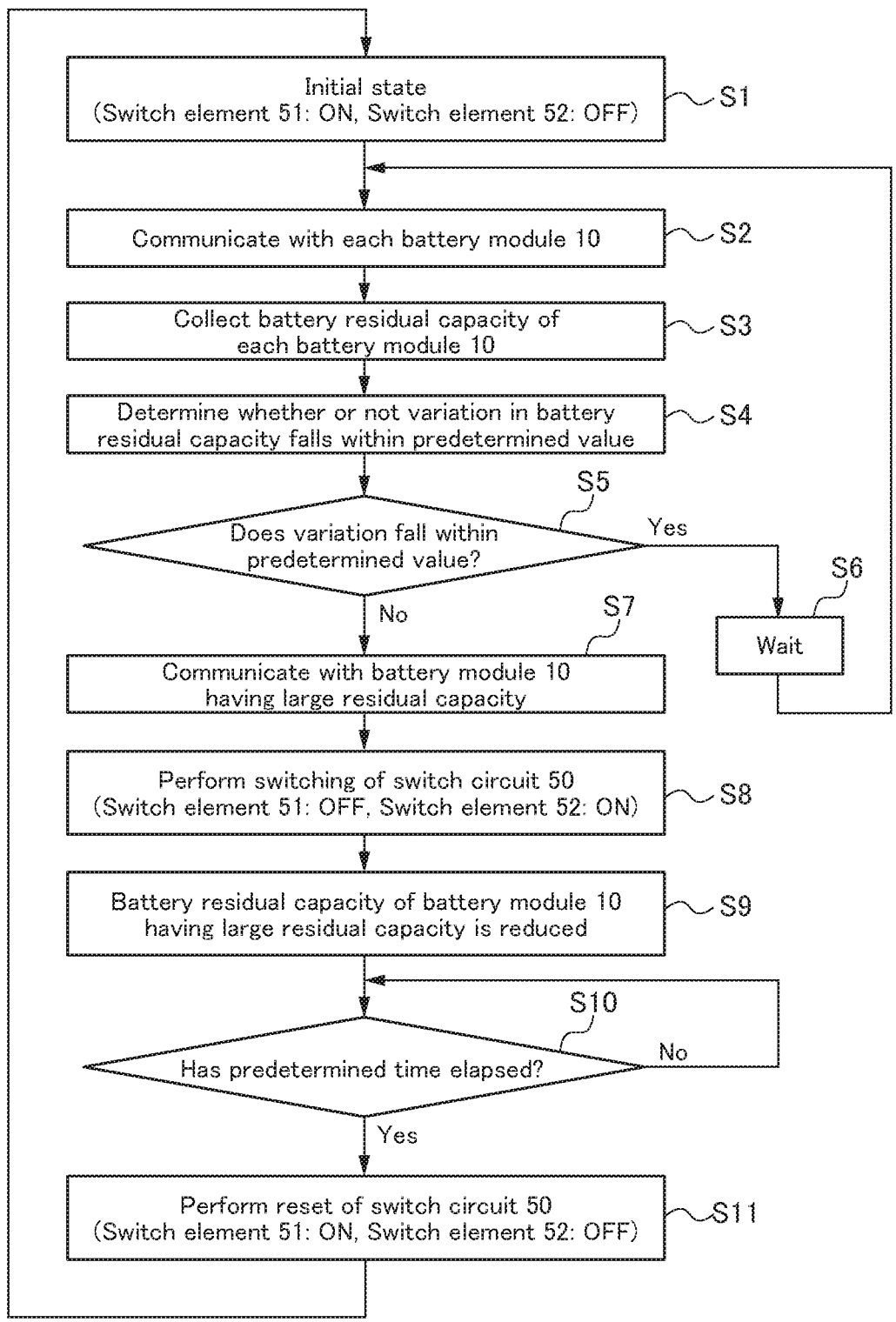
FIG. 4 is a flowchart for explaining the operation of the controller 30.

FIG. 4 is a flowchart for explaining the operation of the controller 30.

In the initial state, the switch elements 51 and 52 included in each battery module 10 are turned ON and OFF, respectively (step S1). In this state, the controller 30 communicates with each battery module 10 (step S2) and acquires the state signal ST therefrom for data collection (step S3). The state signal ST includes at least information concerning the battery residual capacity of the battery module 10. Thus, it is possible to calculate a variation in the battery residual capacity among the plurality of battery modules 10.

Then, the controller 30 assesses a variation in the battery residual capacity among the plurality of battery modules 10 and determines whether or not the variation falls within a predetermined value (step S4). When the variation falls within a predetermined value (Yes in step S5), the controller 30 returns to step S2 after the elapse of a certain time (step S6).

On the other hand, when the variation exceeds a predetermined value (No in step S5), the controller 30 communicates with a battery module(s) 10 having a large residual capacity (step S7) and performs the switching of the switch circuit 50 (step S8). The switching of the switch circuit 50 is an operation of turning ON the switch element 52 by activating the switching signal SW2. At this time, the switching signal SW1 is deactivated to turn OFF the switch element 51. The switching of the switch circuit 50 is performed by supplying the control signal CT from the controller 30 to a battery module (s) 10 having a large residual capacity. The switching of the switch circuit 50 may be performed for a battery module 10 having the largest residual capacity, a battery module(s) 10 whose residual capacity is larger than the average value of the residual capacities, or a battery module (s) 10 whose residual capacity is larger than a threshold value. A control signal CT instructing a reset operation may be supplied to a battery module(s) 10 having a small residual capacity. The control signal CT instructing a reset operation need not be supplied anew to a battery module(s) 10 in which the switch circuit 50 has already been reset.

As described above, when the switch element 52 is turned ON, the electric power P1 is supplied from the battery cells 40 to the monitoring circuit 43 and the communication circuit 44. Thus, the battery residual capacities of the battery cells 40 are reduced by the operation of the monitoring circuit 43 and communication circuit 44 (step S9), resulting in a reduction in a variation in the battery residual capacity among the battery modules 10. Then, this state is maintained for a predetermined period of time by the monitoring circuit 43 (step S10), and then the control signal CT instructing a reset operation is supplied from the controller 30 for a reset of the switch circuit(s) 50 in the battery module(s) 10 (step S11). The reset operation of the switch circuit 50 is an operation of turning ON the switch element 51 by activating the switching signal SW1. At this time, the switching signal SW2 is in a deactivated state to turn OFF the switch element 52. It should be noted that, as described above, the control signal CT instructing a reset operation need not be supplied anew to a battery module(s) 10 in which the switch circuit 50 has already been reset and, hence, the controller 30 returns to step S1 (initial state) and repeats the above operations. By the repetition of such operations, a variation in the battery residual capacity is reduced, whereby the battery residual capacity is leveled.

As described above, in the battery module system according to the present embodiment, when a variation in the battery residual capacity occurs among the plurality of battery modules 10, an electric power is consumed by the internal circuit (i.e., monitoring circuit 43 and communication circuit 44) of a battery module(s) 10 having a large residual capacity, so that it is possible to level the battery residual capacity without involving an unnecessary capacity loss. Further, the above power consumption is achieved by the internal circuit that is originally required for the battery module 10, so that it is not necessary to additionally provide an internal discharge mechanism.

While the preferred embodiments of the present invention have been described, the present invention is not limited thereto. Thus, various modifications may be made without departing from the gist of the invention, and all of the modifications thereof are included in the scope of the present invention.

For example, in the above embodiment, the switch element 51 is brought into an ON state in the initial state; however, conversely, the switch element 52 may be brought into an ON state in the initial state. In this case, when a variation in the battery residual capacity exceeding a predetermined value occurs among the plurality of battery modules 10, only required is that the switch element 51 of a battery module(s) 10 having a small residual capacity is turned ON and the switch element 52 thereof is tuned OFF.

Further, in the above embodiment, the switching of the switch circuit 50 is performed under the control of the controller 30; however, it is possible to achieve the switching through communication among the plurality of battery modules 10 without using the controller 30.

What is claimed is:
1. A battery system comprising:
a plurality of battery modules, each of the battery modules including:
an external power supply terminal;
a battery cell;
a monitoring circuit configured to monitor a residual capacity of the battery cell;
a switch circuit configured to supply one of an electric power supplied from the external power supply terminal and an electric power supplied from the battery cell to the monitoring circuit based on a switching signal; and
a control terminal; and
a controller configured to supply a control signal to the control terminals of the plurality of battery modules,
wherein the monitoring circuit is further configured to supply a state signal that is indicative of a residual capacity of the battery cell to the controller through the control terminal,
wherein the controller is further configured to select one of the battery modules based on the supplied state signal,
wherein the controller is further configured to supply the control signal to the control terminal of the selected one of the battery modules, and
wherein the monitoring circuit of the selected one of the battery modules is configured to generate the switching signal in response to the control signal so that the electric power is supplied from the battery cell to the monitoring circuit.

2. The battery system as claimed in claim 1, wherein the controller is further configured to generate the control signal so as to level the battery residual capacity among the plurality of battery modules.

3. The battery system as claimed in claim 1, wherein the selected one of the battery modules has a largest residual capacity among the plurality of battery modules.

4. The battery system as claimed in claim 3,
wherein the controller is further configured to select another one of the battery modules based on the state signal, and to supply the control signal to the control terminal of the selected another one of the battery modules, and
wherein the monitoring circuit of the selected another one of the battery modules is further configured to generate the switching signal in response to the control signal so that the electric power is supplied from the external power supply terminal to the monitoring circuit.

5. The battery system as claimed in claim 4, wherein the residual capacity of the selected another one of the battery modules is less than a predetermined residual capacity.

6. The battery system as claimed in claim 5, wherein the predetermined residual capacity is an average value of the residual capacities of the plurality of battery modules.

7. The battery system as claimed in claim 1, wherein the controller is further configured to assess variation in the residual capacity among the plurality of battery modules.

8. The battery system as claimed in claim 7, wherein the controller is further configured to supply the control signal to the control terminal of at least one of the battery modules when the assessed variation exceeds a predetermined value so that the electric power is supplied from the battery cell to the monitoring circuit in the at least one of the battery modules.

9. The battery system as claimed in claim 8, wherein the at least one of the battery modules includes a battery module having a largest residual capacity among the plurality of battery modules.

10. The battery system as claimed in claim 8, wherein the at least one of the battery modules have the residual capacity that is larger than the average value.

11. The battery system as claimed in claim 1,
wherein each of the battery modules further includes positive and negative electrode terminals that are each provided separately from the external power supply terminal, and
wherein the battery cell is connected between the positive and negative electrode terminals.

* * * * *